United States Patent
Oumi

(10) Patent No.: US 10,118,295 B2
(45) Date of Patent: Nov. 6, 2018

(54) MANUAL FEED APPARATUS OF ROBOT FOR CALCULATING OPERABLE RANGE OF ROBOT

(71) Applicant: FANUC CORPORATION, Yamanashi (JP)

(72) Inventor: Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 215 days.

(21) Appl. No.: 15/293,414

(22) Filed: Oct. 14, 2016

(65) Prior Publication Data

US 2017/0144300 A1 May 25, 2017

(30) Foreign Application Priority Data

Nov. 20, 2015 (JP) ................................ 2015-228057

(51) Int. Cl.
*B25J 9/16* (2006.01)
*B25J 19/06* (2006.01)

(52) U.S. Cl.
CPC ............... *B25J 9/163* (2013.01); *B25J 9/161* (2013.01); *B25J 9/1666* (2013.01); *B25J 9/1676* (2013.01); *B25J 19/06* (2013.01); *G05B 2219/36161* (2013.01); *G05B 2219/36468* (2013.01); *G05B 2219/39082* (2013.01); *G05B 2219/40476* (2013.01)

(58) Field of Classification Search
CPC . B25J 9/163; B25J 9/161; B25J 9/1666; B25J 9/1676; B25J 19/06; G05B 2219/40476; G05B 2219/36161; G05B 2219/39082; G05B 2219/36468
See application file for complete search history.

(56) References Cited

U.S. PATENT DOCUMENTS

| 5,150,452 | A | * | 9/1992 | Pollack | B25J 9/1676 |
| | | | | | 700/255 |
| 5,920,678 | A | | 7/1999 | Watanabe et al. | |
| 8,121,731 | B2 | * | 2/2012 | Ban | B25J 9/1656 |
| | | | | | 700/245 |

(Continued)

FOREIGN PATENT DOCUMENTS

| JP | H0825262 A | 1/1996 |
| JP | 9-141580 A | 6/1997 |

(Continued)

*Primary Examiner* — Jason Holloway
(74) *Attorney, Agent, or Firm* — Hauptman Ham, LLP

(57) ABSTRACT

A manual feed apparatus of a robot comprises an interference calculation apparatus configured to calculate an operable range in which the robot can operate without causing interference. The interference calculation apparatus includes an operation range setting part configured to judge a position at which the robot can operate without interfering with a peripheral object and set the operable range. The operation range setting part calculates the operable range during a period when the robot is stopped. The interference calculation apparatus calculates an operation allowable range in a direction in which the robot operates based on the operable range. The robot control apparatus executes control for reducing a speed of the robot when the operation allowable range is smaller than a predetermined judgement value.

4 Claims, 5 Drawing Sheets

(56) References Cited

U.S. PATENT DOCUMENTS

| | | | |
|---|---|---|---|
| 8,386,080 B2* | 2/2013 | Bosscher | B25J 9/1676 700/245 |
| 9,452,531 B2* | 9/2016 | Kikkeri | B25J 9/1676 |
| 2003/0225479 A1 | 12/2003 | Waled | |
| 2005/0049749 A1* | 3/2005 | Watanabe | B25J 9/1671 700/245 |
| 2007/0118250 A1* | 5/2007 | Nagamatsu | B25J 9/1666 700/251 |
| 2009/0326711 A1* | 12/2009 | Chang | B25J 9/1666 700/248 |
| 2013/0178980 A1* | 7/2013 | Chemouny | B25J 9/1671 700/255 |
| 2016/0000511 A1* | 1/2016 | Hoffmann | B25J 9/1664 606/130 |
| 2016/0327383 A1* | 11/2016 | Becker | G01B 11/005 |
| 2017/0210008 A1* | 7/2017 | Maeda | B25J 9/0087 |

FOREIGN PATENT DOCUMENTS

| | | |
|---|---|---|
| JP | 2002-219684 A | 8/2002 |
| JP | 2004-1217 A | 1/2004 |
| JP | 2010-52114 A | 3/2010 |
| JP | 2013136123 A | 7/2013 |

* cited by examiner

MANUAL FEED APPARATUS OF ROBOT FOR CALCULATING OPERABLE RANGE OF ROBOT

RELATED APPLICATIONS

The present application claims priority to Japanese Patent Application Number 2015-228057, filed Nov. 20, 2015, the disclosure of which is hereby incorporated by reference herein in its entirety.

BACKGROUND OF THE INVENTION

1. Field of the Invention

The present invention relates to a manual feed apparatus of a robot.

2. Description of the Related Art

A Robot can convey a workpiece and perform a predetermined operation by changing a position and a posture. A pedestal on which workpieces are placed and a fence is arranged around the robot. An object arranged around the robot may be arranged within a range in which the robot is driven. When the robot is driven, the robot may come into contact with the peripheral object. In other words, the robot may interfere with the peripheral object.

In order to prevent the robot from interfering with the peripheral object, operation program can be generated for limiting the operation range of the robot. For example, when the position and the posture of the robot are set by the operation program, the positions and the postures can be set so that the robot does not interfere with the peripheral object.

In Japanese Unexamined Patent Publication No. 2013-136123, a robot operation teaching support device for supporting generation of an operation program is disclosed. A robot controller of the operation teaching support device calculates a position in the future relating to an operation and a posture of the robot. It is disclosed that a simulator displays a posture of the robot in the operation at the calculated future position on a screen and judges the presence or absence of interference of the robot at the future position.

SUMMARY OF THE INVENTION

A robot is automatically driven based on an operation program and also manually driven by a worker in some cases. For example, in order to generate an operation program, the worker drives a robot and determines a position and a posture of the robot, and then a robot control apparatus may store the position and the posture. The teaching operation panel is connected to the robot control apparatus in order to manually change the position and the posture of the robot.

An operation part such as a button is arranged on the teaching operation panel for driving the robot. The worker can change the position and the posture of the robot by operating the operation part of the teaching operation panel. Such an operation by the worker is referred to as a jog operation.

When the robot is manually operated, the robot may interfere with a peripheral object. According to the conventional technique, when a robot is manually operated, a worker visually judges whether or not the robot interferes with the object around the robot. Thus, when performing a manual operation, the worker has to perform the operation while paying attention so as not to bring the robot into contact with the peripheral object. Alternatively, when the worker performs an erroneous operation or does not notice the peripheral object, the robot may interfere with the peripheral object.

A manual feed apparatus of a robot according to the present invention includes a manual operation panel configured to transmit a command to manually operate the robot by a worker and a robot control apparatus configured to control an operation of the robot according to an operation of the manual operation panel. The manual feed apparatus includes an interference calculation apparatus configured to calculate an operable range in which the robot can operate. The operable range is a range in which the robot can move without causing interference of an object arranged around the robot with the robot or an end effector. The interference calculation apparatus includes a robot state acquisition part configured to acquire a current state of the robot. The interference calculation apparatus includes an operation range setting part configured to judge a position at which the robot can operate without interfering with a peripheral object in order of position closer to the current state of the robot and set the operable range. The interference calculation apparatus includes a storage part configured to store the operable range set by the operation range setting part. The operation range setting part calculates the operable range during a period when the robot is stopped. The robot control apparatus transmits a direction in which the robot operates to the interference calculation apparatus when a manual operation of the robot is started. The interference calculation apparatus calculates an operation allowable range in the direction in which the robot operates based on the operable range and transmits the operation allowable range to the robot control apparatus. When the operation allowable range is smaller than a predetermined judgement value, the robot control apparatus executes a control for reducing a speed of the robot lower than a predetermined manual operation speed or a control for stopping the robot.

In the above-described invention, the operation range setting part can calculate, when the robot is stopped, the operable range up to an initial position which is closer than a limit position which is a limit position which the robot can reach. The robot state acquisition part can acquire the current state of the robot after the manual operation of the robot is started. The operation range setting part can calculate the operable range up to a position farther than the initial position in the direction in which the robot operates, and the storage part can update the stored operable range.

In the above-described invention, the object arranged around the robot can include an operable peripheral device, the interference calculation apparatus can include a peripheral state acquisition part configured to acquire a state of the peripheral device, the operation range setting part can calculate the operable range based on a current state of the peripheral device, and the storage part can update the stored operable range.

In the above-described invention, the peripheral state acquisition part can acquire the state of the peripheral device based on at least one of a communication signal of the robot control apparatus and the peripheral device and an output signal of a detector configured to detect the state of the peripheral device.

DETAILED DESCRIPTION

A manual feed apparatus of a robot in an embodiment is described with reference to FIG. 1 to FIG. 5. The manual feed apparatus of the robot is an apparatus for driving the robot by a worker operating a manual operation panel. The manual feed apparatus of the present embodiment is arranged in a robot system.

Figure 1:
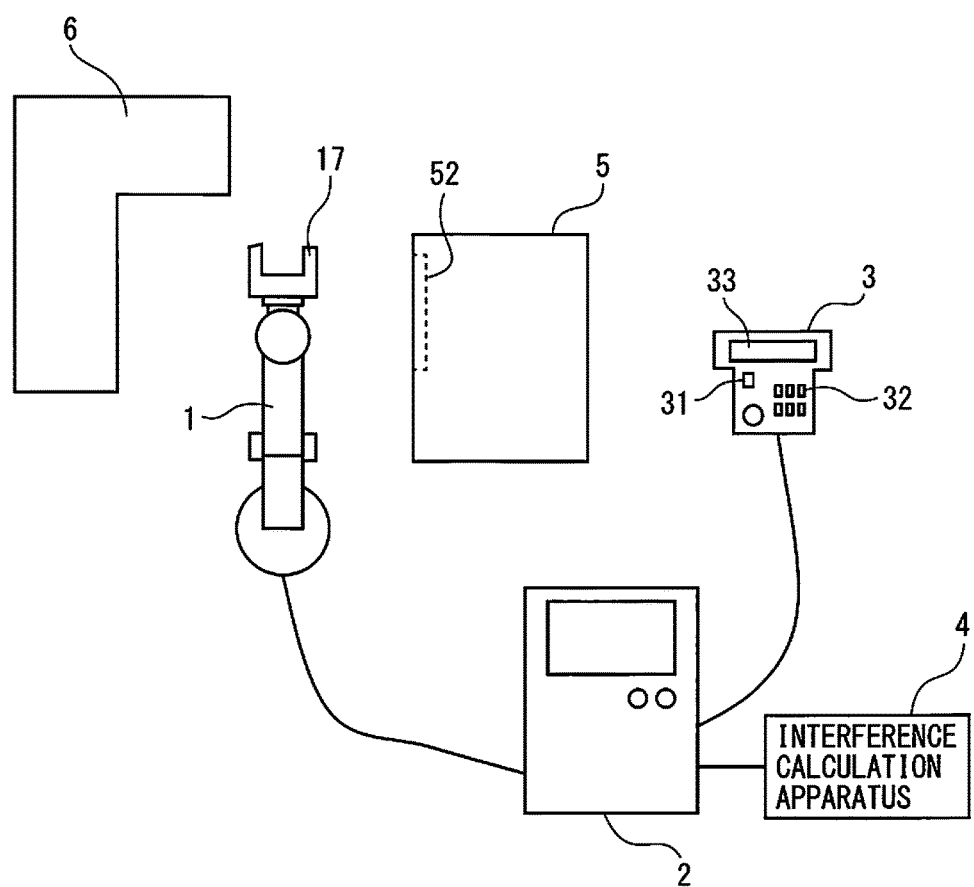
FIG. 1 is a schematic diagram of a robot system in an embodiment.
Figure 2:
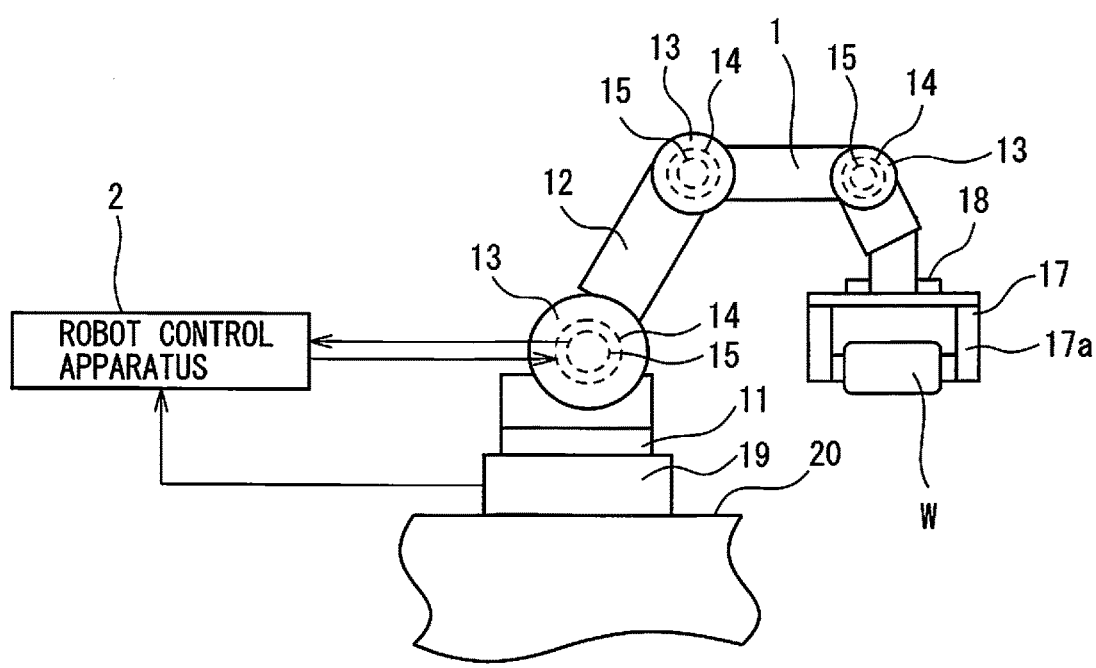
FIG. 2 is a schematic diagram of a robot control apparatus, a robot, and a hand in the embodiment.

FIG. 1 is a schematic diagram of the robot system in the present embodiment. FIG. 2 shows a schematic diagram of a robot, a hand, and a robot control apparatus of the present embodiment. With reference to FIG. 1 and FIG. 2, the robot system of the present embodiment comprises a robot 1 for conveying a workpiece W and a robot control apparatus 2 for controlling the robot 1. A hand 17 as an end effector is coupled to the robot 1. The robot 1 of the present embodiment is an articulated robot including an arm 12 and a plurality of joint parts 13.

The robot 1 includes an arm drive apparatus for driving each arm 12. The arm drive apparatus includes an arm drive motor 14 arranged within the joint part 13. When the arm drive motor 14 drives, the arm 12 can turn toward a desired direction at the joint part 13. The robot 1 includes a base part 19 for supporting the arm 12 and a revolving part 11 revolving about the base part 19. The base part 19 is fixed on an installation surface 20. The revolving part 11 revolves about a drive axis extending in a vertical direction. When the revolving part 11 revolves, a direction of the arm 12 can be changed. The arm drive apparatus includes a drive motor for driving the revolving part 11.

The hand 17 has a function of gripping and releasing the workpiece W. The hand 17 includes a claw part 17a. The robot 1 includes a hand drive apparatus for opening and closing the claw part 17a. The hand drive apparatus of the present embodiment includes a hand drive cylinder 18 for pneumatically driving the hand 17. The end effector is not limited to this embodiment, and an apparatus for performing an arbitrary operation can be connected to the robot 1.

The robot 1 includes a state detector for detecting a movement of the arm 12 with respect to the drive axis. The robot control apparatus 2 detects a position and a posture of the robot 1 from an output of the state detector. The state detector in the present embodiment includes a rotation position detector 15 attached to the arm drive motor 14. The rotation position detector 15 detects a rotation position when the arm drive motor 14 drives. A posture of the arm 12 at the joint part 13 can be detected based on the rotation position of each arm drive motor 14. Further, the state detector includes a rotation position detector attached to a drive motor for driving the revolving part 11. A direction to which the arm 12 is extended can be detected based on the rotation position of the revolving part 11.

The manual feed apparatus of the robot in the present embodiment includes a teaching operation panel 3 serving as a manual operation panel for transmitting a command from a worker to manually operate the robot 1. The teaching operation panel 3 is connected to the robot control apparatus 2. The teaching operation panel 3 is formed to be able to communicate with the robot control apparatus 2.

The teaching operation panel 3 of the present embodiment includes a coordinate system selection button 31 for selecting a coordinate system to be displayed on a display part 33 of the teaching operation panel 3. By pressing the coordinate system selection button 31, the worker can select a world coordinate system specific to the robot in which a position of the origin is not changed when the robot is driven, a tool coordinate system which regards a tool end point as the origin and moves together with the end effector, or the like. The worker can manually operate the robot 1 with reference to a coordinate value displayed on the display part 33.

The teaching operation panel 3 is formed to be able to drive the robot 1 to a predetermined direction. The teaching operation panel 3 of the present embodiment is formed to be able to move the robot 1 to an X-axis direction, a Y-axis direction, and a Z-axis direction in the selected coordinate system. The teaching operation panel 3 includes a jog button 32 for driving the robot 1 to the desired direction. In the present embodiment, the jog button 32 for moving to a positive side and the jog button 32 for moving to a negative side are arranged for each moving axis. For example, when the worker presses the jog button 32 of the positive side of the X-axis, the robot 1 is driven to move the tool end point to a positive direction of the X-axis in the selected coordinate system.

The manual operation panel for manually operating the robot is not limited to the teaching operation panel, and an arbitrary embodiment can be adopted thereto. For example, the manual operation panel may be built in the robot control apparatus. Further, the manual operation panel may include a jog dial and the like for driving the robot to a direction of a selected axis by rotating a disk shaped knob instead of the jog button.

The robot system of the present embodiment includes a pedestal 6 and a machine tool 5 as objects arranged around the robot 1. A part of the pedestal 6 is arranged in an area inside an operational limit position of the robot 1 as described below. A part of the machine tool 5 is arranged in an area inside the operational limit position of the robot 1. In the present embodiment, the pedestal 6 and the machine tool 5 are arranged at positions at which interference with the robot 1 may occur.

Figure 3:
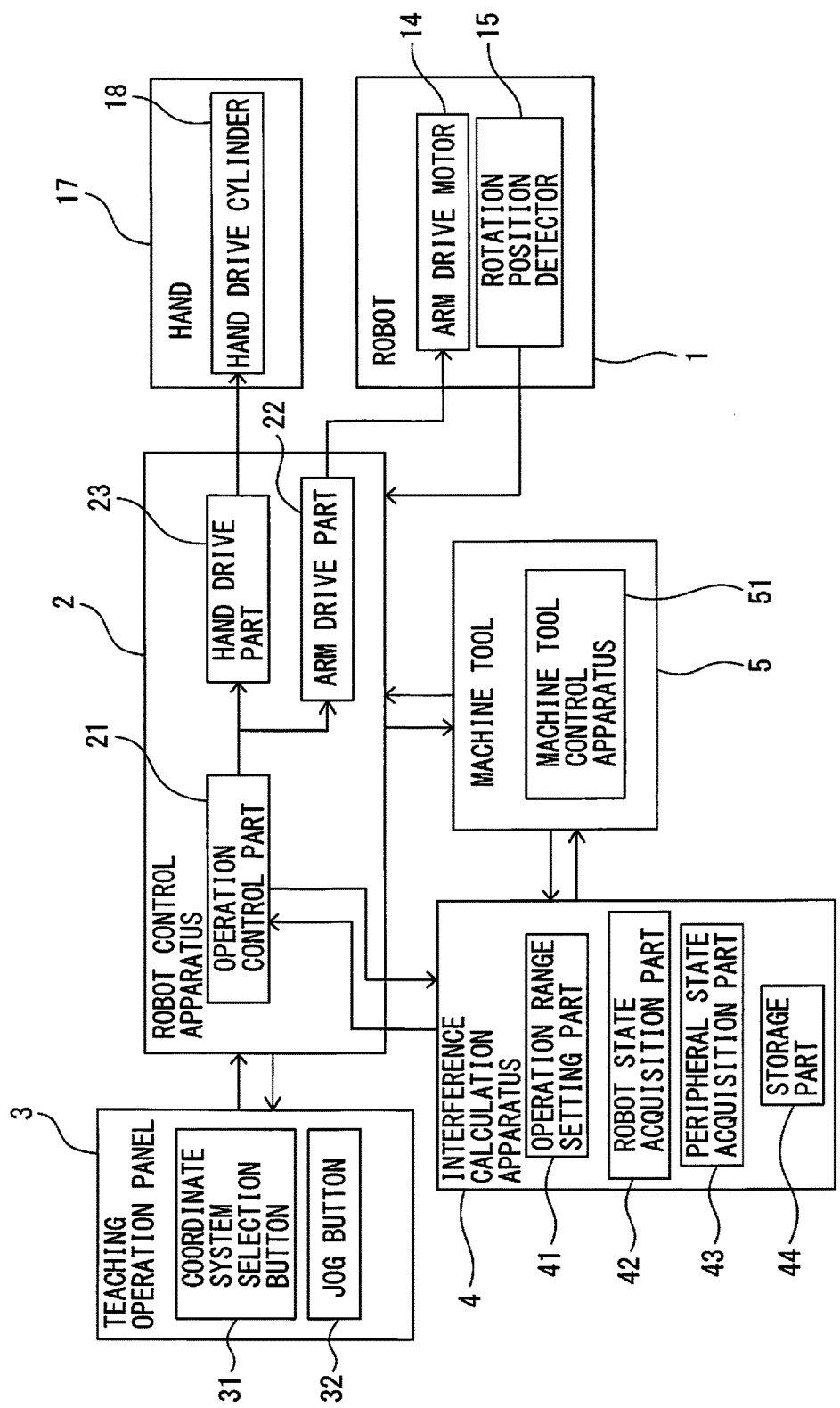
FIG. 3 is a block diagram of the robot system in the embodiment.

FIG. 3 shows a block diagram of the robot system in the present embodiment. With reference to FIG. 1 to FIG. 3, the robot control apparatus 2 includes arithmetic processing apparatuses including a CPU (Central Processing Unit), a RAM (Random Access Memory), a ROM (Read Only Memory), and the like which are connected with each other via a bus. The robot control apparatus 2 can drive the robot 1 based on an operation program input in advance.

The robot control apparatus 2 includes an operation control part 21. The operation control part 21 transmits an operation command to drive the robot 1 and the hand 17. The operation control part 21 transmits the operation command for driving the robot 1 to an arm drive part 22. The arm drive part 22 includes an electric circuit for driving a motor such as the arm drive motor 14. The arm drive part 22 supplies electricity to the arm drive motor 14 and the like based on the operation command. The operation control part 21 transmits the operation command for driving the hand 17 to a hand drive part 23. The hand drive part 23 includes an electric circuit for driving a pump for supplying air to the hand drive cylinder 18 and the like. The hand drive part 23 supplies electricity to the pump for driving the hand drive cylinder 18 based on the operation command.

With reference to FIG. 1 and FIG. 3, the manual feed apparatus in the present embodiment comprises an interference calculation apparatus 4 for calculating an operable range in which the robot 1 can operate. The operable range of the robot 1 herein is a range in which the robot 1 can move without causing interference of the robot 1 or the hand 17 with an object arranged around the robot 1.

The interference calculation apparatus 4 is constituted of arithmetic processing apparatuses including the CPU, the RAM, and the like. The interference calculation apparatus 4 is formed to be able to mutually communicate with the robot control apparatus 2. The communication between the robot control apparatus 2 and the interference calculation apparatus 4 can be implemented by, for example, Ethernet (registered trademark) and the like. The robot control apparatus and the interference calculation apparatus may constitute a single arithmetic processing apparatus.

The interference calculation apparatus 4 includes a storage part 44 for storing arbitrary information. The storage part 44 stores information regarding the robot 1 and the hand 17 such as shapes and dimensions of the robot 1 and the hand 17 in advance. Further, the storage part 44 stores information regarding an object around the robot 1 such as a shape and dimensions of the object around the robot 1. For example, shapes of the pedestal 6 and the machine tool 5 are stored as coordinate values in the world coordinate system specific to the robot.

The interference calculation apparatus 4 includes a robot state acquisition part 42 for acquiring a current state of the robot 1. The robot state acquisition part 42 receives a signal from the state detector via the robot control apparatus 2. In the present embodiment, the robot state acquisition part 42 acquires a signal of the rotation position detector 15 attached to the drive motor of the robot 1. The robot state acquisition part 42 can calculate the position and the posture of the robot 1 based on an output signal of the rotation position detector 15. The robot state acquisition part 42 may acquire a signal transmitted from the operation control part 21 to the arm drive part 22 and acquires the position and the posture of the robot 1.

Figure 4:
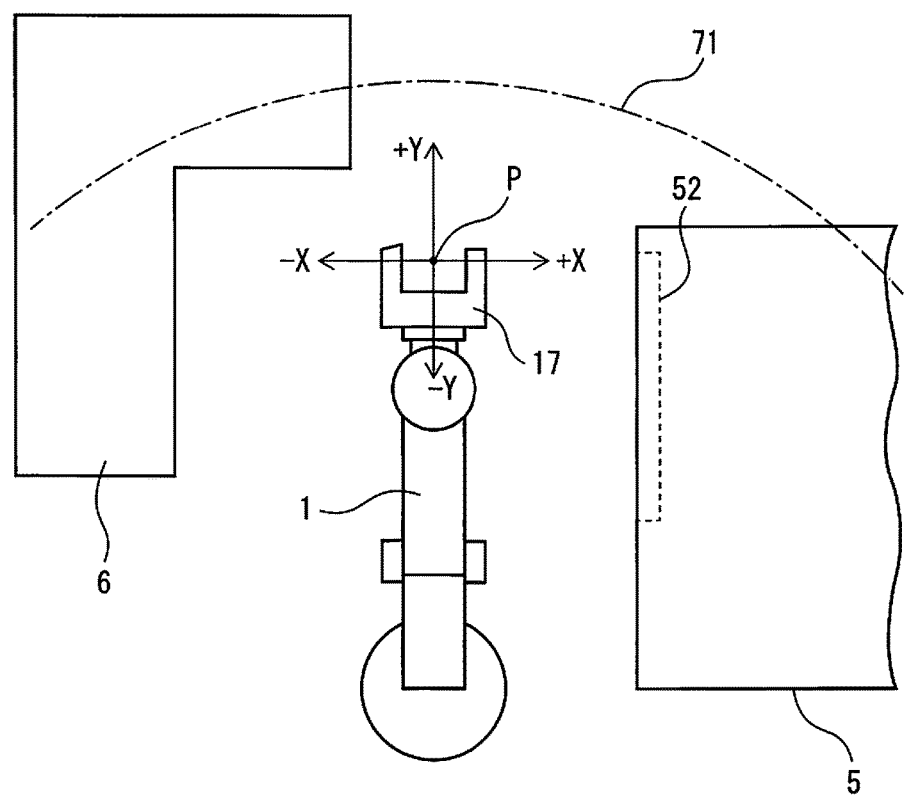
FIG. 4 is a schematic plan view enlarging the robot and peripheral object.

FIG. 4 shows an enlarged schematic plan view of the robot and objects around the robot in the present embodiment. In FIG. 4, the X-axis and the Y-axis of the tool coordinate system in the current state of the robot are illustrated. The Z-axis extends in a direction vertical to the X-axis and the Y-axis. A tool end point P at the current state of the robot 1 corresponds to the origin of the tool coordinate system.

A limit position 71 which is a limit position where the robot 1 can reach is set to the robot 1. The limit position 71 corresponds to, for example, a farthest position to which the tool end point P can move. In an area inside the limit position 71, the robot 1 can place the tool end point P on an arbitrary position.

In the example illustrated in FIG. 4, the part of the pedestal 6 and the part of the machine tool 5 are arranged inside the area set by the limit position 71. Thus, when the robot 1 is driven, there is a risk that the hand 17 or the robot 1 interferes with the pedestal 6 or the machine tool 5.

With reference to FIG. 3, the interference calculation apparatus 4 includes an operation range setting part 41 for setting the operable range of the robot 1 based on the current state of the robot 1. The operation range setting part 41 in the present embodiment sets the operable range during a period when the robot 1 is stopped. The operation range setting part 41 sets the operable range based on an operable position.

The operation range setting part 41 of the present embodiment judges an operable position at which the robot 1 can operate without interfering with the peripheral object (hereinafter, referred to as a peripheral device) in order of position closer to the current state of the robot 1. For example, the operation range setting part 41 calculates the state of the robot 1 when moving from a current position of the robot 1 to the positive direction of the X-axis by a predetermined minute distance DL. Further, the operation range setting part 41 judges whether or not the robot 1 or the hand 17 interferes with the peripheral device. For example, the operation range setting part 41 calculates whether or not interference with the machine tool 5 or the pedestal 6 occurs when the tool end point P moves to the positive direction of the X-axis by three millimeters.

Next, the operation range setting part 41 also judges whether or not the robot 1 or the hand 17 interferes with the peripheral device when the robot 1 moves the minute distance with respect to the negative direction of the X-axis, the positive direction of the Y-axis, the negative direction of the Y-axis, the positive direction of the Z-axis, and the negative direction of the Z-axis.

Next, the operation range setting part 41 judges whether or not the robot 1 or the hand 17 interferes with the peripheral device when further moving the predetermined minute distance DL to the positive direction of the X-axis. In other words, it is judged whether or not interference occurs by the movement for a distance two times of the minute distance DL from the current position to the positive direction of the X-axis. For example, the operation range setting part 41 judges whether or not the interference occurs when the tool end point P further moves three millimeters to the positive direction of the X-axis. The similar calculation is repeated with respect to the negative direction of the X-axis, the positive direction of the Y-axis, the negative direction of the Y-axis, the positive direction of the Z-axis, and the negative direction of the Z-axis.

As described above, it is judged whether or not the robot 1 interferes with the peripheral device when the tool end point P moves from a position near the current position to a distant position with respect to each axis.

The control can be executed until the robot 1 reaches the limit position 71. Alternatively, the control can be executed to a distance at which interference with the peripheral device occurs when the robot 1 moves to each axis direction. For example, in FIG. 4, when the tool end point P moves to the positive direction of the X-axis, the hand 17 interferes with the machine tool 5 at the time when moving a certain distance. The operation range setting part 41 stops the calculation with respect to a position in the X-axis direction which is farther than a position at which the interference is detected. As described above, the calculation is performed from a position near the current position to a distant position, so that unnecessary calculation can be avoided. Further, a calculation time can be shortened.

The robot control apparatus 2 may have a function of rotating the hand 17 about each axis in the selected coordinate system. The jog button 32 of the teaching operation panel 3 may include a jog button for rotating the hand 17 about each axis in the selected coordinate system. The worker can change the direction of the hand 17 by pressing the jog button.

When the robot control apparatus 2 has the function of rotating the hand 17 about a predetermined axis, the operation range setting part 41 judges whether or not interference occurs when the hand 17 is rotated from the current position of the robot about the predetermined axis by a predetermined minute angle. Both of a clockwise rotation and a counterclockwise rotation can be adopted as a rotation direction. For example, the operation range setting part 41 judges whether or not the robot 1 or the hand 17 interferes with the peripheral device when the hand 17 is rotated in the clockwise direction by three degrees about the X-axis. The operation range setting part 41 judges whether or not the robot 1 or the hand 17 interferes with the peripheral device when the hand 17 is rotated in the counterclockwise direction by three degrees about the X-axis. The operation range setting part 41 repeats the similar calculation by rotating the hand 17 by every minute angle up to a predetermined rotation angle. The direction for rotating the hand 17 is not limited to one direction, and rotation may be performed in mutually opposite two directions. For example, the hand 17 may be rotated in the clockwise direction by 180 degrees and in the counterclockwise direction by 180 degrees. Further, the operation range setting part 41 can execute the calculation when the hand 17 is rotated about the Y-axis and the Z-axis as with the X-axis. In the control, judgement can also be performed in order of closeness to the current state of the robot.

The storage part 44 stores the position, the posture, and the result judged by the operation range setting part 41. The operation range setting part 41 can set the operable range of the robot 1 based on the position and the posture at which whether the interference occurs has been judged and the result thereof. The operation range setting part 41 can set a range of the position and the posture at which the interference does not occur to the operable range. Regarding the rotation operation of the hand 17, the operation range setting part 41 can also set the operable range of the robot 1 based on the position and the posture at which whether the interference occurs has been judged and the result thereof.

As described above, the operation range setting part 41 judges a position at which the robot 1 can operate without interfering with the peripheral object. The operation range setting part 41 can judge the operable position in order of closeness to the current state of the robot. The operation range setting part 41 can set a range in which the operable position is arranged to the operable range.

The operation range setting part 41 can execute calculation of the operable range before the worker presses the jog button 32. Further, the operation range setting part 41 can execute the calculation of the operable range every time the worker stops pressing of the jog button 32. The calculation of the operable range can be executed every time the robot 1 is stopped. The worker presses the jog button 32, and the position and the posture of the robot 1 are changed. Accordingly, the interference calculation apparatus 4 can calculate the operable range based on a stop position.

The worker presses the jog button 32 on the teaching operation panel 3 so as to move the robot 1 to the desired direction. For example, the robot 1 is moved to the positive direction of the X-axis. The operation control part 21 of the robot control apparatus 2 transmits the direction to which the robot 1 moves to the interference calculation apparatus 4.

The interference calculation apparatus 4 transmits an operation allowable range in the direction in which the robot operates to the operation control part 21. The operation allowable range is set based on the operable range. When the operation allowable range is smaller than a predetermined stop judgement value, the operation control part 21 stops the robot 1. The stop judgement value is stored in advance in the storage part 44 of the robot control apparatus 2. The storage part 44 also stores a deceleration judgement value greater than the stop judgement value. When the operation allowable range is greater than or equal to the stop judgement value and smaller than the deceleration judgement value, the operation control part 21 executes control for driving the robot at a speed lower than a predetermined manual operation speed.

For example, the operation range setting part 41 transmits to the operation control part 21 the farthest allowable position on the positive side of the X-axis from the current position of the robot 1 when moving the robot 1 to the positive direction of the X-axis. The operation control part 21 executes control for stopping the robot 1 when a movable distance is less than the predetermined stop judgement value. When the robot 1 is stopped, control for maintaining a stop state of the robot 1 is executed. When the movable distance is greater than or equal to the predetermined stop judgement value and less than the deceleration judgement value, the operation control part 21 executes control for driving the robot at a speed slower than a normal manual operation speed.

The control for reducing the speed of the robot 1 or the control for stopping the robot 1 of the present embodiment can be executed when the worker presses the jog button 32. In other words, when the manual operation of the robot 1 is started, the control can be executed. Alternatively, these controls can be executed during a period when the robot 1 is manually operated. These controls are executed, and thus interference of the robot 1 with the peripheral object can be avoided during the period when the robot 1 is manually operated.

With reference to FIG. 4, it is preferable that the interference calculation apparatus 4 executes the calculation of the operable range up to the limit position 71 with respect to each axis during a stop period of the robot 1. However, it may take a time when the interference calculation apparatus 4 executes the calculation of the operable range up to the limit position 71 with respect to all axes. On the other hand, there is a case that a stop time of the robot 1 is short, and driving of the robot 1 is started before the interference calculation apparatus 4 calculates to the limit position 71. The interference calculation apparatus 4 calculates the operable range up to an initial position during the stop period of the robot 1. The initial position is a position at which the operable range is calculated when the robot is stopped and a position closer to the current position than the limit position.

The interference calculation apparatus 4 of the present embodiment also calculates the operable range during when the robot 1 is operated and executes control for updating the operable range stored in the storage part 44. The robot state acquisition part 42 acquires the current state of the robot 1 after the manual operation of the robot 1 is started. The operation range setting part 41 calculates the operable range to a position farther than the initial position in the direction in which the robot 1 operates.

For example, when the hand 17 is operated to move to the positive direction of the X-axis, the position at which the robot 1 can operate without interfering with the peripheral object is calculated at a position exceeding the initial position in the positive direction of the X-axis. The calculation can also be executed in order of closeness to the current state of the robot 1. The storage part 44 stores the operable range newly set by the operation range setting part 41. In other words, the storage part 44 updates the operable range.

When the stop time of the robot 1 is short and the operation range setting part 41 cannot calculate the operable range up to the limit position 71, the stored operable range can be expanded while moving the robot 1. Alternatively, the operation range setting part 41 may calculate the operable range up to the initial position smaller than the limit position 71 during the stop period of the robot 1 by instruction of the worker. In this case, the stored operable range can be expanded.

An object arranged around the robot 1 may be an operable peripheral device. With reference to FIG. 4, the machine tool 5 of the present embodiment includes an openable and closable door 52. When the door 52 is opened, the robot 1 can enter the inside of the machine tool 5. For example, the robot 1 can arrange a workpiece on a table placed inside a housing of the machine tool 5. The operable range of the robot 1 is changed according to a state of the door 52 which is opened or closed. As described above, the operable range of the robot 1 may be changed according to the state of the peripheral device.

With reference to FIG. 3, the machine tool 5 includes a machine tool control apparatus 51 for controlling the machine tool. The machine tool control apparatus 51 is constituted of arithmetic processing apparatuses including the CPU, the RAM, and the like. The machine tool control apparatus 51 is formed to be able to communicate with the robot control apparatus 2 and the interference calculation apparatus 4. The interference calculation apparatus 4 in the present embodiment includes a peripheral state acquisition part 43 for acquiring a state of an operable peripheral device. The peripheral state acquisition part 43 acquires a fact that a state of the peripheral device around the robot 1 is changed. The peripheral state acquisition part 43 acquires the state of the door 52 of the machine tool 5 from an output of the machine tool control apparatus 51.

The operation range setting part 41 can set the operable range based on the current state of the peripheral device acquired by the peripheral state acquisition part 43. For example, when the door 52 of the machine tool 5 is opened, the operable range becomes larger since the robot 1 is allowed to enter the inside of the door 52. The operation range setting part 41 sets the operable range based on the current state of the peripheral device. By this control, the operation range setting part 41 can change the operable range according to the current state of the peripheral device. This control can be executed during the period when the robot 1 is stopped. Alternatively, this control can be executed during the period when the manual operation is executed.

The peripheral state acquisition part 43 of the present embodiment acquires the state of the peripheral device based on a signal of the state of the door 52 output from the machine tool control apparatus 51. The peripheral state acquisition part 43 is not limited to this embodiment and can acquire the state of the peripheral device based on a communication signal of the robot control apparatus 2 and the peripheral device around the robot 1. The peripheral state acquisition part 43 can detect an input signal, an output signal, a register value, or the like of the robot control apparatus 2. For example, the state of the door 52 can be acquired based on a signal of a command to open the door 52 transmitted from the operation control part 21 to the machine tool 5. Alternatively, when the machine tool 5 includes a detector for detecting the state of the door 52, the peripheral state acquisition part 43 can acquire the state of the door 52 based on a signal of the detector.

Further, the peripheral state acquisition part 43 of the present embodiment can acquire a state of the end effector attached to the robot 1. A shape of the hand 17 of the present embodiment is changed when the claw part 17a is opened or closed. The operable range in a state when the claw part 17a is opened is smaller than the operable range in a state when the claw part 17a is closed. Thus, the operation range setting part 41 can set the operable range based on the state of the end effector. By this control, the operation range setting part 41 can set the operable range according to the current state of the end effector.

The peripheral state acquisition part 43 can acquire the state of the hand 17 based on a signal for opening and closing the hand 17 transmitted from the operation control part 21. For example, when a signal for gripping the workpiece W is not transmitted, the operation range setting part 41 can calculate the operable range based on the shape of the hand 17 with the claw part 17a closed. Further, when the signal for gripping the workpiece W is transmitted, the operation range setting part 41 can calculate the operable range based on the shape of the hand 17 when the claw part 17a grips the workpiece W. Alternatively, when the hand 17 includes a detector for detecting the state of the claw part 17a, the peripheral state acquisition part 43 can acquire the state of the hand 17 based on a signal from the detector.

Figure 5:
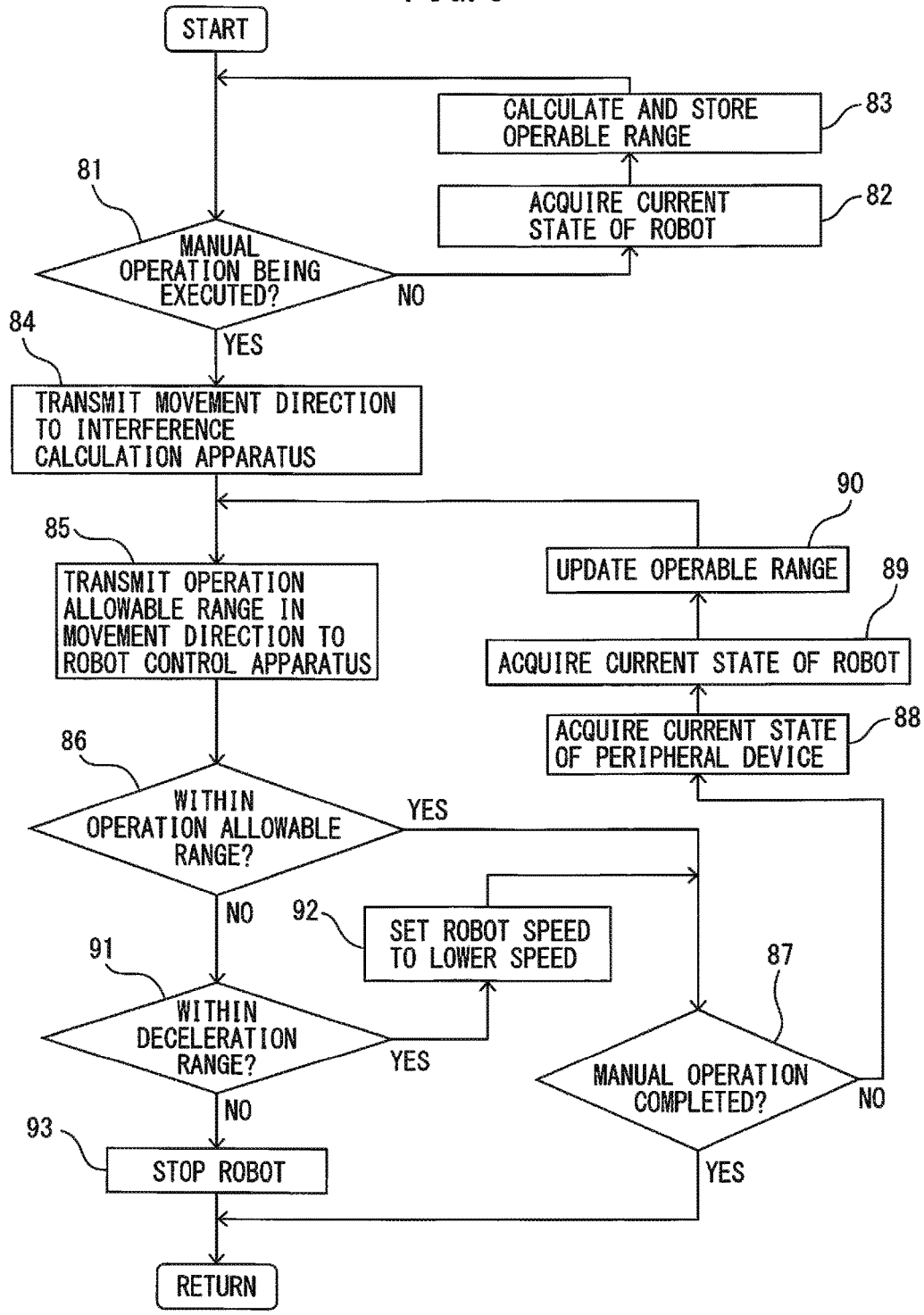
FIG. 5 is a flowchart for controlling a manual feed apparatus of the robot in the embodiment.

FIG. 5 shows a flowchart of control of the manual feed apparatus of the robot in the present embodiment. The control illustrated in FIG. 5 can be started before the manual operation of the robot 1. Further, the control can be executed when the worker releases hand from the jog button 32 and stops the manual operation of the robot 1.

In a step 81, it is judged whether or not the manual operation is executed. In other words, it is judged whether or not the worker presses the jog button 32 on the teaching operation panel 3. When the manual operation is not executed in the step 81, the control shifts to a step 82.

In the step 82, the interference calculation apparatus 4 acquires the current state of the robot 1. In a step 83, the interference calculation apparatus 4 calculates the operable range and stores the calculated operable range. At that time, the peripheral state acquisition part 43 may acquire the state of the peripheral device, and the operation range setting part 41 may set the operable range based on the state of the peripheral device. As described above, the operable range is set during the stop period of the robot 1.

When the manual operation is executed in the step 81, the control shifts to a step 84. In the step 84, the operation control part 21 of the robot control apparatus 2 transmits a movement direction of the robot 1 to the interference calculation apparatus 4.

Next, in a step 85, the operation range setting part 41 transmits to the operation control part 21 the operation allowable range in the movement direction of the robot based on the operable range.

In a step 86, the operation control part 21 judges whether or not the current position and posture of the robot 1 are within a range in which driving at a predetermined speed is allowed. The operation control part 21 judges whether or not a distance in which an operation is allowed in the movement direction of the robot 1 is less than the deceleration judgement value.

In the step 86, when the current position and posture of the robot 1 are within the allowable range, the control shifts to a step 87. In the step 87, the interference calculation apparatus 4 judges whether or not the manual operation is completed. In the present embodiment, it is judged whether or not the worker stops pressing of the jog button 32. When the manual operation is completed in the step 87, the control is terminated. When the manual operation is not completed in the step 87, the control shifts to a step 88.

In the step 88, the peripheral state acquisition part 43 acquires the current state of the peripheral device. In a step 89, the robot state acquisition part 42 acquires the current state of the robot 1.

Next, in a step 90, the operation range setting part 41 calculates the operable range based on the current state of the robot 1 and the state of the peripheral device and updates the operable range stored in the storage part 44. Then, the control returns to the step 85, and the similar control is executed.

When the current position and posture of the robot 1 are not within the allowable range in the step 86, the control shifts to a step 91.

In the step 91, it is judged whether or not the current position is within a range in which deceleration is executed. In the present embodiment, the operation control part 21 judges whether or not the distance in which an operation is allowed in the movement direction of the robot 1 is less than the stop judgement value. When the distance in which an operation is allowed is greater than or equal to the stop judgement value, the operation control part 21 judges that the current position is within the range in which deceleration is executed. In this case, the control shifts to a step 92. The operation control part 21 sets the speed of the robot 1 to a speed lower than the predetermined manual operation speed. In other words, the operation control part 21 executes the control for reducing the operation speed of the robot 1. Subsequently, the control shifts to the step 87, and the control of the robot 1 is continued.

The control from the step 85 to the step 92 can be repeatedly executed during a period when the robot 1 is driven. The control from the step 85 to the step 92 can be executed for every predetermined time interval. Alternatively, the control from the step 85 to the step 92 can be executed every time the robot 1 moves a predetermined distance.

When the distance in which an operation is allowed is less than the stop judgement value in the step 91, the operation control part 21 can judge that the current position and posture are within the range in which the robot 1 is stopped. In this case, the control shifts to a step 93, and the operation control part 21 executes control to prohibit driving of the robot 1. In other words, the operation control part 21 stops the robot 1.

When the operation speed of the robot is reduced or the robot is stopped in the step 92 or in the step 93, for example, the robot control apparatus 2 can execute control to display a warning on the display part.

According to the present invention, the manual feed apparatus of the robot which can avoid interference with an object around the robot can be provided.

In each of the above-described controls, the order of steps can be appropriately changed within a range in which the functions and actions are not changed. In each of the above-described drawings, same or corresponding portions are denoted by the same reference numerals. The above-described embodiment is illustrative and not intended to limit the present invention. Further, the embodiment includes modification of the embodiment described in the scope of the present invention.

The invention claimed is:

1. A manual feed apparatus of a robot comprising:
    a manual operation panel configured to transmit a command to manually operate a robot by a worker;
    a robot control apparatus configured to control an operation of the robot according to an operation of the manual operation panel; and
    an interference calculation apparatus configured to calculate an operable range in which the robot can operate, wherein
    the operable range is a range in which the robot can move without causing interference of an object arranged around the robot with the robot or an end effector,
    the interference calculation apparatus includes a robot state acquisition part configured to acquire a current state of the robot, an operation range setting part configured to judge a position of the robot at which the robot or the end effector can operate without interfering with a peripheral object in order of closeness to the current state of the robot and set the operable range, and a storage part configured to store the operable range set by the operation range setting part,
    the operation range setting part calculates the operable range during a period when the robot is stopped by performing a control for judging the position of the robot at which the robot or the end effector can operate without interfering with the peripheral object when the robot is moved in a direction of a moving axis in the coordinate system selected by the worker in the manual operation panel, the control being repeated at positions in which the robot is moved from a current position in the direction of the movement axis by a minute distance with respect to all of the moving axes in the coordinate system,
    the robot control apparatus transmits a direction in which the robot operates to the interference calculation apparatus when a manual operation of the robot is started,
    the interference calculation apparatus calculates an operation allowable range in the direction in which the robot operates based on the operable range and transmits the operation allowable range to the robot control apparatus, and
    when the operation allowable range is smaller than a predetermined judgement value, the robot control apparatus executes a control for reducing a speed of the robot lower than a predetermined manual operation speed or a control for stopping the robot.

2. The manual feed apparatus of the robot according to claim 1, wherein
    when the robot is stopped, the operation range setting part calculates the operable range up to an initial position which is closer than a limit position which is a limit position which the robot can reach,
    the robot state acquisition part acquires the current state of the robot after the manual operation of the robot is started, and the operation range setting part calculates the operable range up to a position farther than the initial position in the direction in which the robot operates, and
    the storage part updates a stored operable range.

3. The manual feed apparatus of the robot according to claim 1, wherein
    the object arranged around the robot includes an operable peripheral device,
    the interference calculation apparatus includes a peripheral state acquisition part configured to acquire a state of the peripheral device,
    the operation range setting part calculates the operable range based on a current state of the peripheral device, and
    the storage part updates a stored operable range.

4. The manual feed apparatus of the robot according to claim 3, wherein the peripheral state acquisition part acquires the state of the peripheral device based on at least one of a communication signal of the robot control apparatus and the peripheral device and an output signal of a detector configured to detect the state of the peripheral device.

* * * * *